(12) United States Patent
Kamikawa et al.

(10) Patent No.: US 10,190,563 B2
(45) Date of Patent: Jan. 29, 2019

(54) INTERNAL COMBUSTION ENGINE IGNITION COIL AND METHOD FOR MANUFACTURING INTERNAL COMBUSTION ENGINE IGNITION COIL

(71) Applicant: Hitachi Automotive Systems Hanshin, Ltd., Sanda-shi, Hyogo (JP)

(72) Inventors: Masayuki Kamikawa, Tokyo (JP); Nobutake Tsuyuno, Tokyo (JP); Toshiaki Ishii, Tokyo (JP); Yoichi Anzo, Sanda (JP)

(73) Assignee: Hitachi Automotive Systems Hanshin, Ltd., Sanda-shi (JP)

( * ) Notice: Subject to any disclaimer, the term of this patent is extended or adjusted under 35 U.S.C. 154(b) by 0 days.

(21) Appl. No.: 15/427,215

(22) Filed: Feb. 8, 2017

(65) Prior Publication Data

US 2017/0241393 A1 Aug. 24, 2017

(30) Foreign Application Priority Data

Feb. 19, 2016 (JP) .................................. 2016-029707

(51) Int. Cl.
*H01F 27/02* (2006.01)
*H01F 27/30* (2006.01)
*H01F 27/29* (2006.01)
*F02P 3/02* (2006.01)
(Continued)

(52) U.S. Cl.
CPC ................ *F02P 3/02* (2013.01); *C08J 3/203* (2013.01); *C08J 3/247* (2013.01); *H01B 3/40* (2013.01);
(Continued)

(58) Field of Classification Search
USPC .......................................................... 336/90
See application file for complete search history.

(56) References Cited

U.S. PATENT DOCUMENTS 5,053,476 A 10/1991 Akutagawa et al.
6,940,382 B2 * 9/2005 Ishikawa ............... H01F 27/327
336/90
(Continued)

FOREIGN PATENT DOCUMENTS

DE 10 2010 039 819 A1 4/2011
EP 2 248 855 A1 11/2010
(Continued)

OTHER PUBLICATIONS

Extended European Search Report issued in counterpart European Application No. 17155620.2 dated Jul. 4, 2017 (12 pages).

*Primary Examiner* — Ronald Hinson
(74) *Attorney, Agent, or Firm* — Crowell & Moring LLP

(57) ABSTRACT

An internal combustion engine ignition coil according to the present invention includes: a central iron core; a primary coil disposed on an outer circumference of the central iron core; a secondary coil disposed on an outer circumference of the primary coil; a side iron core disposed on an outer circumference of the secondary coil; and an insulating material sealing the central iron core, the primary coil, and the secondary coil on an inner side of the side iron core. A first layered silicate having a particle diameter less than a winding diameter of the secondary coil is present at a higher concentration in a vicinity of the secondary coil than that in a vicinity of the side iron core in the insulating material. A second layered silicate having a particle diameter greater than the winding diameter of the secondary coil is present at a higher concentration than that of the first layered silicate between the outer circumference side of the secondary coil and the side iron core. The second layered silicate has an aspect ratio of 50 or more, the aspect ratio being a ratio of a long side of a particle of the layered silicate to a thickness of the particle.

6 Claims, 3 Drawing Sheets

(51) Int. Cl.
  *H01B 3/40* (2006.01)
  *H01F 27/32* (2006.01)
  *H01F 38/12* (2006.01)
  *H01F 41/12* (2006.01)
  *C08J 3/20* (2006.01)
  *C08J 3/24* (2006.01)
  *H01F 27/24* (2006.01)
  *H01F 27/28* (2006.01)

(52) U.S. Cl.
  CPC ............ *H01F 27/24* (2013.01); *H01F 27/28* (2013.01); *H01F 27/327* (2013.01); *H01F 38/12* (2013.01); *H01F 41/127* (2013.01); *C08J 2363/02* (2013.01)

(56) References Cited

U.S. PATENT DOCUMENTS

| | | | |
|---|---|---|---|
| 2005/0076857 A1* | 4/2005 | Ishikawa | H01F 27/327 123/2 |
| 2007/0123055 A1* | 5/2007 | Ishikawa | H01B 3/40 438/758 |
| 2008/0211142 A1 | 9/2008 | Hollstein | |
| 2009/0033452 A1* | 2/2009 | Akimoto | H01F 38/12 336/177 |
| 2009/0156712 A1 | 6/2009 | Boehm et al. | |
| 2012/0212313 A1* | 8/2012 | Burrows | F02P 9/007 336/90 |
| 2012/0299679 A1* | 11/2012 | Kobayashi | H01F 38/12 336/90 |
| 2015/0022304 A1* | 1/2015 | Skinner | H01F 27/28 336/192 |
| 2015/0048914 A1* | 2/2015 | Satoh | H01F 27/022 336/90 |
| 2015/0364246 A1* | 12/2015 | Skinner | H01F 27/325 336/198 |

FOREIGN PATENT DOCUMENTS

| | | |
|---|---|---|
| JP | 2005-2310 A | 1/2005 |
| JP | 2007-5521 A | 1/2007 |

\* cited by examiner

INTERNAL COMBUSTION ENGINE IGNITION COIL AND METHOD FOR MANUFACTURING INTERNAL COMBUSTION ENGINE IGNITION COIL

CLAIM OF PRIORITY

The present application claims priority from Japanese Patent application serial no. 2016-029707, filed on Feb. 19, 2016, the content of which is hereby incorporated by reference into this application.

BACKGROUND OF THE INVENTION

1. Field of the Invention

The present invention relates to an ignition coil supplying a high voltage to a spark plug of an internal combustion engine.

2. Description of the Related Art

An internal combustion engine ignition coil includes a central iron core and a side iron core provided so as to surround the circumference of the central iron core in a coil case. A primary coil connected to a battery is disposed in the outer circumference of the central iron core, and a secondary coil connected to a plug at an interval is disposed in the outer circumference of the primary coil. A side iron core is disposed at an interval in the outer circumference of the secondary coil. In order to secure insulation properties between the primary coil and the secondary coil and insulation properties between the secondary coil and the side iron core, or the like, the coil case is sealed by an insulating resin.

Miniaturization and a high power are required for an internal combustion engine ignition coil supplying a high voltage for generating spark discharge at a spark plug of an internal combustion engine in an engine for a vehicle or the like in association with fuel consumption regulation enforcement. That is, an ignition coil having high endurance even at a high voltage is required.

Examples of the background art of the present technical field include a technique such as JP-2005-2310-A. JP-2005-2310-A discloses "an ignition coil containing a resin composition containing a thermosetting resin and a filler dispersed in the thermosetting resin, wherein a filler particle size distribution curve represents a small-diameter peak A, a large-diameter peak B having a higher frequency than that of the small-diameter peak A, and a valley C which is positioned between the small-diameter peak A and the large-diameter peak B and has a lower frequency than that of the small-diameter peak A".

In JP-2005-2310-A, spherical small-diameter particles A are inserted between spherical large-diameter particles B, to improve the flow property of a resin. The improvement in the flow property of the resin provides an improvement in the permeability of the resin between winding wires, which attempts to suppress breakdown in an insulator.

SUMMARY OF THE INVENTION

High pressure resistance can be expected by applying the technique of dispersing the filler disclosed in JP-2005-2310-A in the resin to the ignition coil. However, a detour effect of an electric treeing progressing along with the filler since the filler is spherical under a high voltage of 15 kV or more does not sufficiently function, which causes a limited effect.

Since the filler exemplified in JP-2005-2310-A and having a small-diameter peak particle diameter of 0.7 to 3 μm has a viscosity greater than that in a filler having a larger particle diameter, relative to the amount of addition, difficult injecting is caused or voids are apt to be contained even in possible injecting when the filler is added in order to exhibit sufficient insulation properties, which disadvantageously causes deterioration in the insulation properties by contrast.

When the content of the small-diameter filler is increased, the small-diameter filler forms a barrier on the circumference of an electric wire, which disadvantageously inhibits the impregnation of the resin to the electric wire by contrast.

The present invention has been made in view of the conventional problems. It is an object of the present invention to provide an internal combustion engine ignition coil which can improve the insulation properties and endurance of an insulating material to correspond to a high power.

In order to solve the problems, an internal combustion engine ignition coil according to the present invention comprising: a central iron core; a primary coil disposed on an outer circumference of the central iron core; a secondary coil disposed on an outer circumference of the primary coil; a side iron core disposed on an outer circumference of the secondary coil; and an insulating material sealing the central iron core, the primary coil, and the secondary coil on an inner side of the side iron core. A first layered silicate having a particle diameter less than a winding diameter of the secondary coil is present at a higher concentration in a vicinity of the secondary coil than that in a vicinity of the side iron core in the insulating material. A second layered silicate having a particle diameter greater than the winding diameter of the secondary coil is present at a higher concentration than that of the first layered silicate between the outer circumference side of the secondary coil and the side iron core. The second layered silicate has an aspect ratio of 50 or more, the aspect ratio being a ratio of a long side of a particle of the layered silicate to a thickness of the particle.

A method for manufacturing an internal combustion engine ignition coil according to the present invention, the method comprising: (a) stirring and mixing an epoxy resin, an acid anhydride having an acid anhydride group of greater than 1 equivalent based on 1 equivalent of an epoxy group of the epoxy resin, a curing accelerator, a first layered silicate, and a second layered silicate having a particle diameter greater than that of the first layered silicate, to produce an epoxy resin composition; and (b) injecting the epoxy resin composition produced in the (a) into a coil case of the previously heated internal combustion engine ignition coil, and heat-treating the epoxy resin composition.

The present invention can provide an ignition coil including an insulating material having high insulation properties and high endurance.

The problems, constitutions, and effects other than those described above are apparent from the descriptions of the following embodiments.

DESCRIPTION OF THE PREFERRED EMBODIMENTS

Figure 1:
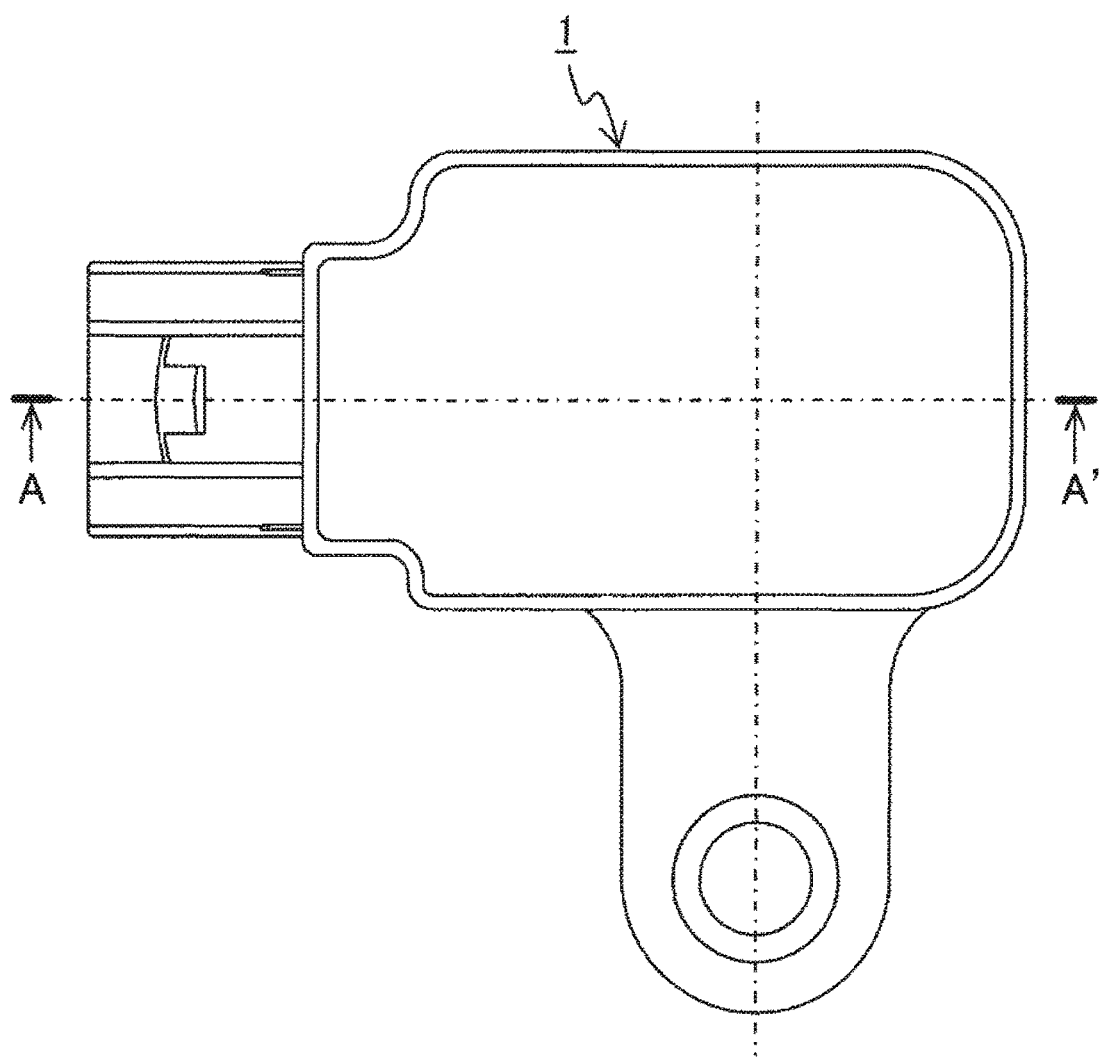
FIG. 1 is a schematic constitution view of an internal combustion engine ignition coil according to one embodiment of the present invention.

Hereinafter, the present invention will be described in detail with reference to the drawings. The same or similar constituent elements in each of the drawings and each of Examples are designated by the same reference numerals, and the detailed descriptions of the overlapped portions are omitted.

Figure 2:
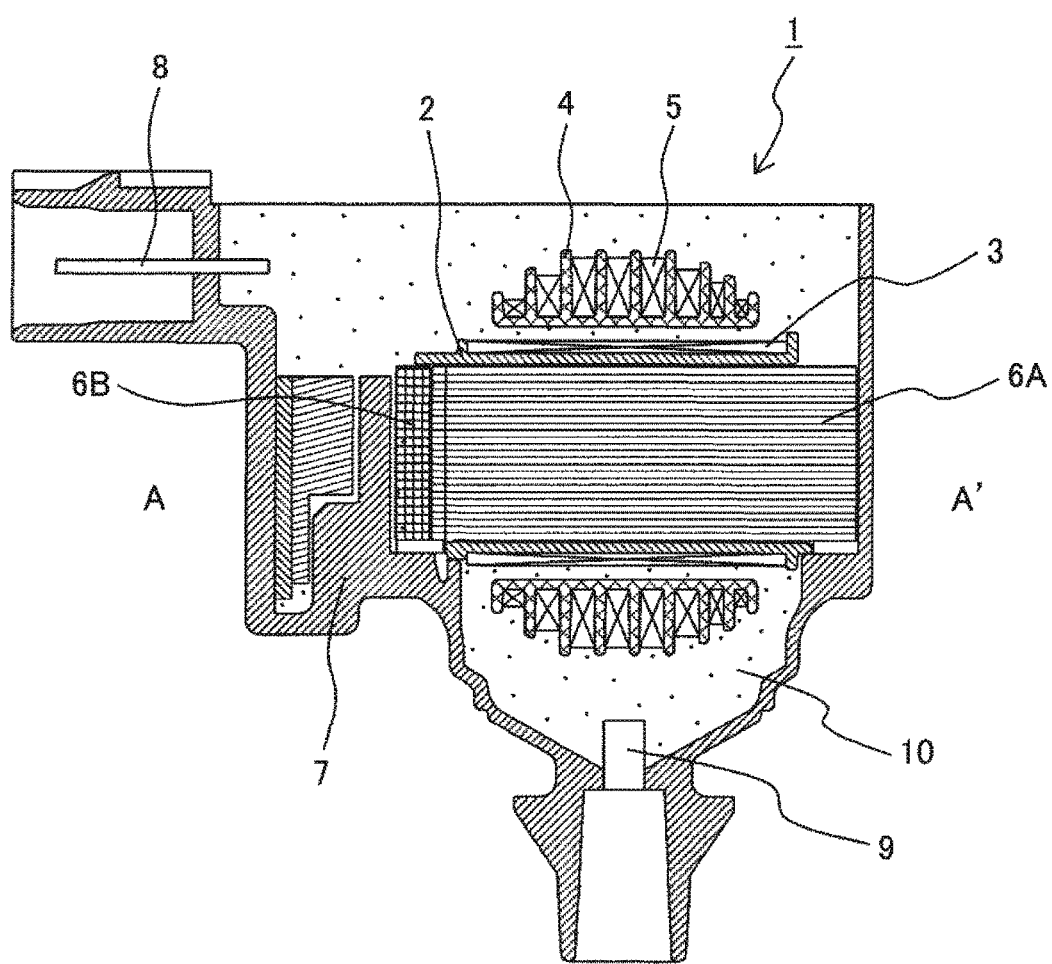
FIG. 2 is an A-A' line sectional view of the internal combustion engine ignition coil in FIG. 1.

One embodiment of an internal combustion engine ignition coil according to the present invention is shown in FIG. 1 and FIG. 2. FIG. 1 is a schematic constitution view of the internal combustion engine ignition coil. FIG. 2 is an A-A' line sectional view of the internal combustion engine ignition coil in FIG. 1.

In FIG. 1, an internal combustion engine ignition coil 1 is an independent ignition type internal combustion engine ignition coil which is mounted on a plughole of each cylinder of an internal combustion engine and is used in a state where the internal combustion engine ignition coil is directly linked to a spark plug. As shown in FIG. 2, the internal combustion engine ignition coil 1 includes an iron core including a central iron core part 6A and a side iron core part 6B. A magnetic circuit is constituted by the iron core. The ignition coil includes a coil case 7, and a primary coil 3 and a secondary coil 5 stored in the coil case 7. The coil case is sealed by injecting an insulating resin 10 into the coil case.

In the present embodiment, the primary coil includes a primary bobbin 2 storing the central iron core part 6A, and an electric wire wound around the primary bobbin. In the iron core 6, a magnetic path as a closed magnetic path is formed by press-laminating a silicon steel plate of 0.2 mm to 0.7 mm. The side iron core part 6B is provided on one end of the central iron core part 6A. The closed magnetic path is formed on an end part of the side iron core part 6B on an opposite side to the side of the central iron core part. An enameled wire having a wire diameter of about 0.3 mm to about 1.0 mm is used for the electric wire of the primary coil 3. The primary coil 3 is formed by lamination-winding the electric wire around the primary bobbin 2 a total of about 100 to about 300 times over several layers, several tens of times per layer.

The secondary coil 5 includes a secondary bobbin 4 provided around the primary bobbin 2, and an electric wire wound around secondary bobbin 4. The secondary bobbin 4 includes a plurality of winding grooves, and is made of a thermoplastic synthetic resin. For example, an enameled wire having a wire diameter of about 0.01 mm to about 0.1 mm is used as the electric wire of the secondary coil 5. The secondary coil 5 is formed by division-winding the enameled wire around the secondary bobbin 4 a total of about 5000 to about 30,000 times.

A permanent magnet magnetized in a direction opposite to a direction in which the iron core 6 is magnetized by the energization of the primary coil 3 may be inserted into a space between the other end of the central iron core part 6A and the side iron core part 6B.

Electrical power supplied to the primary coil 3 is supplied via a terminal 8. A connector is connected to the terminal 8. On the other hand, a high voltage terminal 9 is connected to the secondary coil 5. In the secondary coil 5, a high voltage for generating spark discharge at the spark plug is induced by the energization of the primary coil 3. The high voltage induced in the secondary coil 5 is supplied to the spark plug via the high voltage terminal 9. The spark plug receives the supply of the high voltage induced in the secondary coil 5, to generate the spark discharge.

The insulating resin 10 containing a thermosetting resin is included in the coil case 7 in which the primary coil 3 and the secondary coil 5 are stored. A space formed by the inner side of the coil case 7, the primary coil 3 wound around the primary bobbin 2, and the secondary coil 5 wound around the secondary bobbin 4 is filled with the insulating resin 10. The primary coil 3 and the secondary coil 5 are insulated from each other by curing the insulating resin 10. In the coil case 7, the primary coil 3, the secondary coil 5, the primary bobbin 2, and the secondary bobbin 4 are insulated and fixed by the insulating resin 10.

Figure 3:
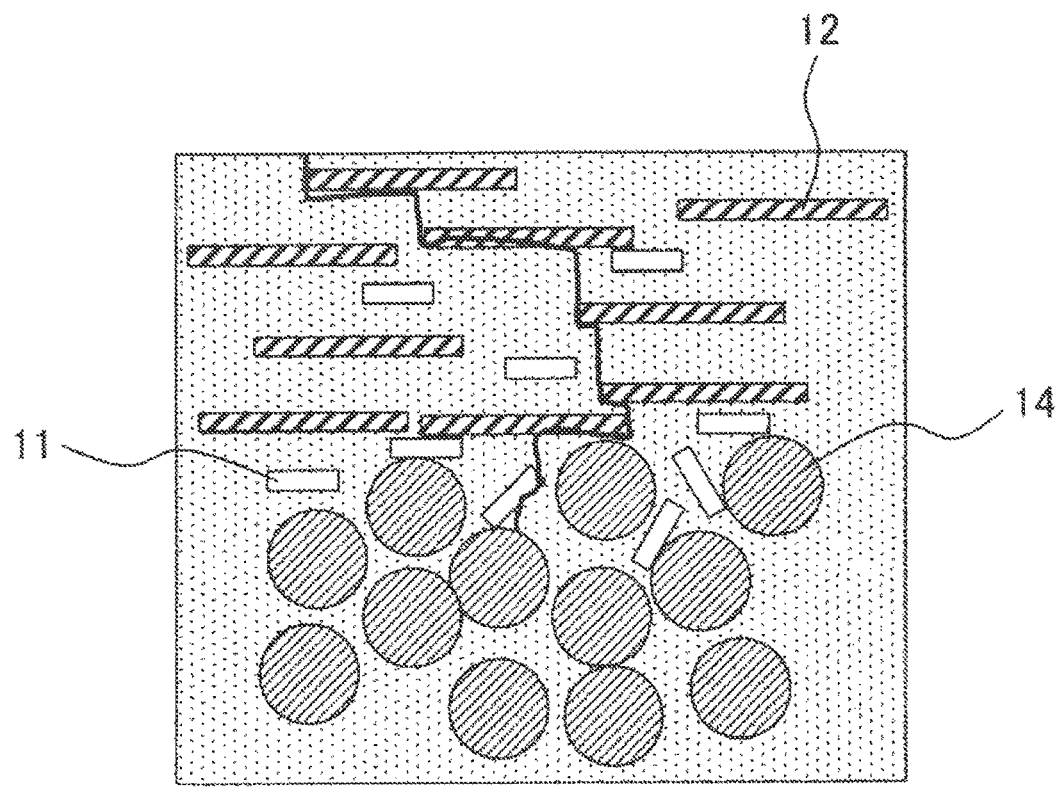
FIG. 3 is a schematic view showing the operation of a layered silicate of the ignition coil according to one embodiment of the present invention.

FIG. 3 is a schematic view of the circumference of an electric wire of an ignition coil according to one embodiment of the present invention. The insulating resin 10 contains an epoxy resin crosslinked with an acid anhydride, and a filler. The filler contains at least two kinds (a layered silicate 11 and a layered silicate 12). The layered silicate 11 has a particle diameter smaller than that of the electric wire (secondary electric wire (secondary conductive wire) 14) used for the secondary coil, and can enter between the electric wires. The layered silicate 12 has a particle diameter greater than that of the secondary electric wire (secondary conductive wire) 14, and cannot enter between the secondary electric wires (secondary conductive wire), but has an average aspect ratio of 50 or more and a high electric treeing detour effect. The filler may contain carboxylic acid amide.

The electric treeing is apt to be generated in a space between an electric wire having a thin wire diameter and a resin. As shown in FIG. 3, since the layered silicate A11 has a particle diameter smaller than the diameter of the secondary electric wire (secondary conductive wire) 14, the layered silicate A11 can enter between the secondary electric wires (secondary conductive wires). Since the layered silicate has a dielectric constant greater than that of the epoxy resin, the presence of the layered silicate near the secondary electric wire (secondary conductive wire) reduces an electric field generated from the secondary electric wire (secondary conductive wire) to allow the generation of the electric treeing to be suppressed. On the other hand, since the layered silicate B12 has a particle diameter greater than the diameter of the secondary electric wire (secondary conductive wire), the layered silicate B12 cannot enter between the secondary electric wires (secondary conductive wires), but the presence of the layered silicate B12 outside the secondary electric wire (secondary conductive wire) develops the electric treeing along the surface when the electric treeing is generated.

Since the aspect ratio is greater than that of a spherical particle (aspect ratio 1) or the like in that case, the progress distance of the electric treeing until breakdown is caused can be largely increased, and therefore, the insulation properties can be improved.

Herein, the aspect ratio is a ratio of the longest side of a particle to the shortest side of the particle, and corresponds to a ratio of the long side of a thin layered silicate to the thickness of the thin layered silicate.

Since the carboxylic acid amide is smaller than a nano filler such as clay or mica, the carboxylic acid amide can easily enter also between the electric wires. Since the carboxylic acid amide has a dielectric constant different from that of an epoxy resin, the generation of the electric treeing can be suppressed by reducing the electric field. Since the carboxylic acid amide is likely to be gasified, the carboxylic acid amide is gasified before the epoxy resin is gasified, which can suppress the extension of the electric treeing. As a result, the insulation properties can be improved. Physical properties such as a glass transition point can be improved.

The carboxylic acid amide is preferably present between the electric wires forming the primary coil or the secondary coil.

As described above, the internal combustion engine ignition coil having high endurance even at the high voltage can be provided by using the insulating material obtained by dispersing the inorganic filler containing at least two kinds of layered silicates having different particle diameters and aspect ratios in the epoxy resin.

For example, a base compound containing an epoxy resin, a curing agent containing an acid anhydride, a cured product of an epoxy resin composition, and an inorganic filler containing at least two kinds of layered silicates having different particle diameters and aspect ratios can be used as the insulating resin 10. The insulating resin 10 may contain a primary amine, a secondary amine, a tertiary amine, or a quaternary amine, wherein an acid anhydride group of the acid anhydride is greater than 1 equivalent based on 1 equivalent of an epoxy group of the epoxy resin.

As the epoxy resin, a conventionally well-known epoxy resin can be used. Examples of the epoxy resin include a bisphenol type epoxy resin and a novolac type epoxy resin which are aromatic epoxy resins. Examples of the bisphenol type epoxy resin include a bisphenol A type epoxy resin, a bisphenol AD type epoxy resin, and a bisphenol F type epoxy resin.

Examples of the novolac type epoxy resin include a phenol novolac type epoxy resin and a cresol novolac type epoxy resin. An alicyclic epoxy resin may be used. Among these, the bisphenol type epoxy resin which is easily treated since it has low volatility and a low viscosity is preferably used, and the bisphenol A type epoxy resin is particularly desirable.

Examples of the acid anhydride used for the epoxy resin composition for forming the insulating resin 10 include phthalic anhydride, trimellitic anhydride, pyromellitic anhydride, benzophenone tetracarboxylic anhydride, ethylene glycol bisanhydro trimellitate, glycerol trisanhydro trimellitate, methyl tetrahydrophthalic anhydride, tetrahydrophthalic anhydride, nadic anhydride, methyl nadic anhydride, trialkyl tetrahydrophthalic anhydride, hexahydrophthalic anhydride, methyl hydrophthalic anhydride, 5-(2,5-dioxotetrahydro furil)-3-methyl-3-cyclohexene-1,2-dicarboxylic anhydride, an adduct of trialkyl tetrahydrophthalic anhydride-maleic acid, dodecenyl succinic anhydride, polyazelaic anhydride, polydodecanedioic anhydride, chlorendic anhydride, 3- or 4-methyl-1,2,3,6-tetrahydrophthalic anhydride, 3- or 4-methyl-hexahydrophthalic anhydride, and methyl-3,6-endomethylene-1,2,3,6-tetrahydrophthalic anhydride. These acid anhydrides are used as a curing agent for an epoxy resin.

In the layered silicate used for the insulating resin 10, an $SiO_4$ tetrahedron shares three continuous oxygen atoms, and has a two-dimensional flat layer structure. The layered silicate is formed by laminating the plurality of layer structures. Hydrogen atoms enter between the layers of the layered silicate, to form hydroxyl groups (OH groups) in many cases. Examples of the layered silicate include mica and its altered minerals such as white mica, phlogopite, biotite, brittle mica, chlorite, phlogopite, lepidolite, muscovite, biotite, paragonite, lepidolite, margarite, and vermiculite.

The average particle diameter of the layered silicate is desirably 2 μm to 20 μm in a small particle diameter. The average particle diameter is desirably 10 μm in a greater particle diameter. When the average particle diameter of the layered silicate is 2 μm or less, a viscosity is increased relative to the amount of addition of layered silicate, which may make it difficult to inject the resin when sufficient insulation properties are tribally obtained. The content of the layered silicate in the resin composition of the present invention is 0.1% by weight to 40% by weight, and preferably 0.5% by weight to 20% by weight. When the content is less than 0.1% by weight, a sufficient breakdown intensity increasing effect is not observed. When the content exceeds 40% by weight, the viscosity of the resin before curing is remarkably increased, which may make it difficult to inject and form the resin.

The layered silicate can also be used as it is, but primary, secondary, or tertiary ammonium ions are preferably inserted (intercalated) between the layers of the layered silicate according to an ionic exchange reaction. By intercalating the amine between the layers of the layered silicate, the layered silicate can be uniformly dispersed at a high density in the insulating resin (cured product) in a state where the layers of the layered silicate are highly peeled off. By intercalating the amine between the layers of the layered silicate, the viscosity is not excessively increased even if the layered silicate is added, which can increase the amount of addition of the layered silicate, and thereby the insulation properties can be improved.

When the layered silicate in which the primary to tertiary amines are intercalated between the layers is used, it is preferable to add the acid anhydride of 1.7 parts by weight to 2.0 parts by weight per 1 part by weight of the layered silicate in which the amine is intercalated.

The ammonium ions are substituted by a maximum of three hydrocarbon groups, but one of them is an alkyl group having carbon atoms of 1 or more, and desirably carbon atoms of 8 or more. The alkyl group provides an improvement in lipophilicity between the layers of a hydrophilic layered silicate forming a salt, and thereby a resin having a low ionicity is likely to effectively penetrate between mica layers.

Since very active thermal motion of the alkyl group is provided by heating at 140° C. or more, the distance between the layers is extended by the thermal motion, which exhibits an effect of making a more resin penetrate between the layers in a curing process. When the resin penetrates between the layers, a part of intercalated organic ions are diffused in the resin, and flow out also out of the mica layer. Since the organic ions brought into contact with the resin are the ammonium ions, the organic ions react with the acid anhydride as the curing agent of the epoxy resin, to form carboxylic acid amide.

Since the side reaction advances in parallel to a cross-linking reaction between the epoxy resin and the acid anhydride, as a main reaction, cross-linkage between the epoxy and the acid anhydride is decreased by the amount of the acid anhydride reacting with the amine adding the equivalent of the acid anhydride to the epoxy resin as in conventional example, which causes a decrease in a glass transition point. Then, by adding the acid anhydride of greater than the equivalent based on the epoxy resin, the cross-linkage between the epoxy and the acid anhydride is sufficiently formed.

A method for intercalating the primary to tertiary amines between the layers of the layered silicate according to an ionic exchange reaction is performed by adding layered silicate powder to primary to tertiary amine solutions, followed by heat-treating, to substitute potassium ions which are present between the layers of the layered silicate by ammonium ions, followed by organic modification. A treating temperature in this case is desirably 40° C. to 100° C. Then, non-substituted ions are removed by filtering and washing, followed by drying, and thereby an organic-inorganic complex which is the layered silicate in which the primary to tertiary amines are intercalated as the ammonium ions between the layers can be obtained.

When the layered silicate in which the primary to tertiary amines are intercalated between the layers is used, the average particle diameter of the layered silicate is preferably 2 μm to 50 μm. This does not cause an excessive increase in the viscosity of the resin composition, and can also prevent a particle size reduction problem without causing peeling-off between the layers of the layered silicate.

On the other hand, when the average particle diameter of the layered silicate is less than 1 μm (in nanodispersion), the surface area of the layered silicate is excessively increased. Therefore, the viscosity of the resin composition is excessively increased, which makes it difficult to add 5% by mass or more of the layered silicate. Therefore, various effects such as improvements in an insulating life, electrical insulation properties, gas barrier properties, and heat conductivity obtained by adding a sufficient amount of the layered silicate may be unable to be sufficiently obtained. The particle size reduction problem is also caused without causing peeling-off between the layers of the layered silicate.

On the other hand, when the average particle diameter of the primary particles of the layered silicate exceeds 50 μm, a fine portion of electronic parts may be unable to be filled with the layered silicate used as the resin composition.

When the carboxylic acid amide is used, the content of the acid anhydride in the epoxy resin composition may be greater than 1 equivalent based on the epoxy resin in order to form an insulating material (insulating resin) containing the carboxylic acid amide and the epoxy resin. When the acid anhydride is used as the curing agent, usually, the number of the acid anhydride groups is suitably about 0.8 to about 0.9 based on one epoxy group. However, when the amine is contained in the resin composition in order to form the carboxylic acid amide, the acid anhydride reacts with not only the epoxy resin but also the amine, which causes insufficient epoxy crosslinking when the content of the acid anhydride is 1 equivalent or less based on the epoxy resin. This causes deterioration in physical properties such as a decrease in a glass transition point, which may cause deterioration in the endurance of the insulating material. Therefore, the acid anhydride of greater than 1 equivalent required for the curing reaction with the epoxy resin is added, which sufficiently advances an epoxy curing reaction, and thereby the deterioration in the endurance can be suppressed.

0.5 mol of the acid anhydride reacts with 1 mol of the amine to form the carboxylic acid amide. Therefore, it is desirable that 1 equivalent of the acid anhydride is added to the epoxy resin, and 0.4 mol to 0.6 mol of the acid anhydride is added to 1 mol of the added amine. That is, the content of the acid anhydride is preferably 1.01 equivalent to 5 equivalent based on the epoxy resin, and more preferably 1.05 equivalent to 3 equivalent.

Although the breakdown of the resin is generated by the progress of the electric treeing, the carboxylic acid amide which is likely to be gasified as compared with the epoxy resin is present in the resin, which is likely to provide an increase in a pressure during gasification caused by electric spark to provide a decrease in electric discharge according to Paschens Law. As a result, the progress speed of the electric treeing is decreased, which can provide an improvement in insulation properties.

Primary to tertiary amines are used as the amine. A quaternary amine has low reactivity with the acid anhydride without having N—H bond having high reactivity, which is not suitable. The quaternary amine can be appropriately added since it adjusts the reactivity (reaction speed) between the primary to tertiary amines and the acid anhydride.

Examples of the amine include primary amines such as octylamine, laurylamine, tetradecylamine, hexadecyl amine, stearylamine, oleylamine, acrylamine, benzylamine, and amiline; secondary amines such as dilaurylamine, ditetradecylamine, dihexadecylamine, distearylamine, and N-methylamine; and tertiary amines such as dimethyloctylamine, dimethyldecylamine, dimethyllaurylamine, dimethylmyristylamine, dimethylpalmitylamine, dimethylstearylamine, dilaurylmonomethylamine, tributylamine, trioctylamine, and N,N-dimethylanikine. These primary to tertiary amines may be used alone or as a mixture of two or more kinds.

The content of the amine in the epoxy resin composition is preferably 0.1 parts by weight to 20 parts by weight, and more preferably 0.5 parts by weight to 10 parts by weight, based on the epoxy resin. When the content of the amine is less than 0.1 parts by weight, the glass transition point is decreased, which causes a decrease in the endurance under a high-temperature environment. On the other hand, when the content of the amine exceeds 20 parts by weight, a coefficient of linear expansion is increased, which causes an increase in the incidence rate of crack or peeling-off.

In the epoxy resin composition, a curing accelerator can be blended in addition to the epoxy resin, the acid anhydride, the layered silicate, and the amine. Examples of the curing accelerator include, but are not limited to, imidazole compounds such as 2-ethyl-4-methyl imidazole and 1-benzyl-2-ethyl imidazole, diazabicycloundecene (DBU), and diazabicyclononene (DBN).

An inorganic filler other than the layered silicate may be added to the insulating material according to the present invention. The inorganic filler is blended in order to provide an improvement in heat resistance and a reduction in a coefficient of thermal expansion, or the like. Examples of the inorganic filler include aluminum hydroxide, clay, talc, alumina, and glass powder. In the present invention, aluminum hydroxide and silica are preferable, and silica is particularly preferable.

The inorganic filler desirably has small separation and sedimentation, and a slight viscosity increase during blending, and the average particle diameter of the inorganic filler is preferably 1 μm to 50 μm. The inorganic filler may be blended with the base compound, the curing agent, or both the base compound and the curing agent. The amount of the inorganic filler to be blended is preferably 10 parts by weight to 300 parts by weight based on a total of 100 parts by weight of the epoxy resin and the curing agent. When the amount of the inorganic filler to be blended is less than 10 parts by weight, an effect of blending the inorganic filler is decreased. When the amount of the inorganic filler to be blended is greater than 300 parts by weight, the viscosity is increased, which may make it difficult to treat the base compound and the curing agent after being mixed. In the present invention, an antifoaming agent, a coupling agent, a reaction diluent, a thixotropy applying agent, and a colorant or the like can also be used if needed in addition to the materials.

The insulating material of the present invention can be used for also insulating electric equipment having a coil. For example, the coil of the motor is impregnated with the insulating material, which can provide an improvement in the insulation properties.

<Method for Manufacturing Ignition Coil>

A method for manufacturing an ignition coil according to the present invention includes a resin composition preparing step and a curing treating step of curing a resin composition.

A method for preparing a resin composition is not particularly limited, and a normal method is applied. For example, a base compound mainly containing an epoxy resin can be prepared by blending an epoxy resin, a layered silicate, an inorganic filler, and other additive agents or the like, and stirring and mixing these in a device such as a DC motor, a stone milling machine, or a disperser. Similarly, a curing agent mainly containing an acid anhydride can be prepared by stirring and mixing an acid anhydride as a curing agent for an epoxy resin, a layered silicate, an inorganic filler, and other additive agents or the like.

In the resin composition preparing step, an epoxy resin, a layered silicate, an amine, and an acid anhydride added such that the amount of an acid anhydride group is greater than 1 equivalent based on 1 equivalent of an epoxy group of the epoxy resin are preferably stirred and mixed while being subjected to vacuum defoaming. This is because the carboxylic acid amide is generated when the acid anhydride group of the acid anhydride is greater than 1 equivalent based on 1 equivalent of the epoxy group of the epoxy resin. The carboxylic acid amide generated by the reaction of the primary to tertiary amines and the acid anhydride with each other is present in the resin, which provides an improvement in insulation properties.

In the resin composition preparing step, the epoxy resin, the amine, the layered silicate, and the acid anhydride added such that the amount of the acid anhydride is set to 1.7 parts by weight or more and 2.0 parts by weight or less based on the total weight of the amine and the layered silicate may be stirred and mixed while being subjected to vacuum defoaming. The insulation properties are improved by adding and mixing the acid anhydride such that the amount of the acid anhydride is set to 1.7 parts by weight or more and 2.0 parts by weight or less based on the total weight of the amine and the layered silicate.

The curing treating step is a heating step after injecting a resin composition into a coil case 7. The resin composition according to the present invention can be cured by heating. The curing treating step may be heated after injecting the resin composition into the previously heated coil case 7. A curing temperature is preferably 140° C. or more from a point of the thermal motion of the alkyl group, and more preferably 180° C. or more.

The epoxy resin composition may be formed as follows. After the carboxylic acid amide is generated by previously reacting the amine and the acid anhydride with each other, the epoxy resin composition is formed by adding the epoxy resin to the carboxylic acid amide, and the epoxy resin composition is then cured. The treating temperature in that case is desirably 40° C. to 100° C.

Examples of the present invention are shown as follows, but the present invention is not limited to these Examples.

Example 1

<Manufacture of Ignition Coil>

100 parts by weight of a bisphenol A type epoxy resin (JER828 manufactured by Mitsubishi Chemical Corporation), 90 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of synthetic mica (Micro Mica MK-100, average particle diameter: 3.4 µm to 5.5 µm, aspect ratio: 30 to 55, manufactured by Co-op Chemical Co., Ltd.), and 4 parts by weight of synthetic mica (Micro Mica KM, average particle diameter: 16.2 µm to 21.6 µm, aspect ratio: 130 to 210, manufactured by Co-op Chemical Co., Ltd.) were added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 2

100 parts by weight of a bisphenol A type epoxy resin (JER828 manufactured by Mitsubishi Chemical Corporation), 50 parts by weight of methyl-3,6-endomethylene-1,2,3,6-tetrahydrophthalic anhydride (MHAC-P manufactured by Hitachi Chemical Co., Ltd.), 0.85 parts by weight of a curing accelerator (Curazol 2E4MZ manufactured by Shikoku Chemicals Corporation), 1 part by weight of natural mica (Y-1800, average particle diameter: 10 µm, aspect ratio: 70, manufactured by Yamaguchi Mica), and 4 parts by weight of natural mica (Y-3000, average particle diameter: 23 µm, aspect ratio: 70, manufactured by Natural Mica) were added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 3

12 parts by weight of N-methyl stearyl amine (manufactured by Tokyo Chemical Industry Co., Ltd.) was added to 100 parts by weight of a bisphenol A type epoxy resin (JER828 manufactured by Mitsubishi Chemical Corporation), and 70 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of natural mica (Y-1800, average particle diameter: 10 µm, aspect ratio: 70, manufactured by Yamaguchi Mica), and 4 parts by weight of natural mica (Y-3000, average particle diameter: 23 µm, aspect ratio: 70, manufactured by Natural Mica) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 4

12 parts by weight of N,N-dimethyloctadecyl amine (manufactured by Tokyo Chemical Industry Co., Ltd.) was added to 100 parts by weight of a bisphenol A type epoxy resin (JER828 manufactured by Mitsubishi Chemical Corporation), and 60 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of natural mica (Y-1800, average particle diameter: 10 μm, aspect ratio: 70, manufactured by Yamaguchi Mica), and 4 parts by weight of natural mica (Y-3000, average particle diameter: 23 μm, aspect ratio: 70, manufactured by Natural Mica) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 5

12 parts by weight of stearyl amine (manufactured by Tokyo Chemical Industry Co., Ltd.) was added to 100 parts by weight of a bisphenol A type epoxy resin (JER828 manufactured by Mitsubishi Chemical Corporation), and 90 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of natural mica (Y-1800, average particle diameter: 10 μm, aspect ratio: 70, manufactured by Yamaguchi Mica), and 4 parts by weight of natural mica (Y-3000, average particle diameter: 23 μm, aspect ratio: 70, manufactured by Natural Mica) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 6

12 parts by weight of N-methyl stearyl amine (manufactured by Tokyo Chemical Industry Co., Ltd.) was added to 100 parts by weight of a bisphenol A type epoxy resin (JER828 manufactured by Mitsubishi Chemical Corporation), and 70 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of synthetic mica (ME-100, average particle diameter: 5.6 μm to 7.6 μm, aspect ratio: 56 to 76, manufactured by Co-op Chemical Co., Ltd.), and 4 parts by weight of synthetic mica (Micro Mica KM, average particle diameter: 16.2 μm to 21.6 μm, aspect ratio: 130 to 210, manufactured by Co-op Chemical Co., Ltd.) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 7

12 parts by weight of N,N-dimethyloctadecyl amine (manufactured by Tokyo Chemical Industry Co., Ltd.) was added to 100 parts by weight of a bisphenol A type epoxy resin (JER828 manufactured by Mitsubishi Chemical Corporation), and 60 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), 1 part by weight of synthetic mica (ME-100, average particle diameter: 5.6 μm to 7.6 μm, aspect ratio: 56 to 76, manufactured by Co-op Chemical Co., Ltd.), and 4 parts by weight of synthetic mica (Micro Mica KM, average particle diameter: 16.2 μm to 21.6 μm, aspect ratio: 130 to 210, manufactured by Co-op Chemical Co., Ltd.) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 8

<Synthesis of Layered Silicate Having Intercalated Amine>

560 ml of distilled water was added to 7 g of synthetic mica (ME-100, average particle diameter: 5.6 μm to 7.6 μm, aspect ratio: 56 to 76, manufactured by Co-op Chemical Co., Ltd.), and these were stirred at 350 rpm at 80° C. under reflux flow for 2 hours, to disperse the mica in the solution. Separately, 173 ml of hydrochloric acid having a concentration of 0.07 mol/L and various primary to tertiary amines (8.9 mmol) as intercalating agents were stirred at 350 rpm at 80° C. under reflux flow for 2 hours to prepare an amine ion solution.

The mixed amine ion solution was added to a solution in which mica was dispersed, and the mixed solution was stirred at 350 rpm at 80° C. under reflux flow for 2 hours. After stirring, the mixed solution was suction-filtered to obtain a precipitate. The obtained precipitate was washed by using 50 ml of a solution obtained by mixing distilled water of 80° C. and ethanol (volume ratio 1:1). By repeating the operation 10 times, sodium chloride produced by the reaction and the unreacted ammonium ions were removed.

The washed precipitate was then dried at 80° C. under reduced pressure for 10 hours, and then ground to obtain a layered silicate having intercalated ammonium ions.

<Manufacture of Ignition Coil>

Stearyl amine (manufactured by Tokyo Chemical Industry Co., Ltd.) was inserted between layers of synthetic mica (ME-100, average particle diameter: 5.6 μm to 7.6 μm, aspect ratio: 56 to 76, manufactured by Co-op Chemical Co., Ltd.) used as a layered silicate, to produce a product material. 1.5 parts by weight of the product material was added to 100 parts by weight of a bisphenol A type epoxy resin (JER828 manufactured by Mitsubishi Chemical Corporation), and 60 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), and 4 parts by weight of synthetic mica (Micro Mica KM, average particle diameter: 16.2 μm to 21.6 μm, aspect ratio: 130 to 210, manufactured by Co-op Chemical Co., Ltd.) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

[Example 9]

Synthetic mica having intercalated amine was obtained by the same method as that of Example 8.

N-methyl stearyl amine (manufactured by Tokyo Chemical Industry Co., Ltd.) was inserted between layers of synthetic mica (ME-100, average particle diameter: 5.6 μm to 7.6 μm, aspect ratio: 56 to 76, manufactured by Co-op Chemical Co., Ltd.) used as a layered silicate, to produce a product material.

13 parts by weight of the product material was added to 100 parts by weight of a bisphenol A type epoxy resin (JER828 manufactured by Mitsubishi Chemical Corporation), and 70 parts by weight of methyl-3,6-endomethylene-1,2,3,6-tetrahydrophthalic anhydride (MHAC-P manufactured by Hitachi Chemical Co., Ltd.), 1.7 parts by weight of a curing accelerator (DBU manufactured by Sun Apro K.K.), and 4 parts by weight of synthetic mica (Micro Mica KM, average particle diameter: 16.2 μm to 21.6 μm, aspect ratio: 130 to 210, manufactured by Co-op Chemical Co., Ltd.) were then added, followed by mixing by stirring, and vacuum defoaming, to prepare a resin composition. The resin composition was injected into a coil case previously heated to 60° C., where the resin composition was subjected to vacuum defoaming, and then subjected to a curing treatment at 140° C. for 5 hours, to obtain an ignition coil.

Example 10

Synthetic mica having intercalated amine was obtained by the same method as that of Example 8.

N-methyl stearyl amine (manufactured by Tokyo Chemical Industry Co., Ltd.) was inserted between layers of synthetic mica (ME-100, average particle diameter: 5.6 μm to 7.6 μm, aspect ratio: 56 to 76, manufactured by Co-op Chemical Co., Ltd.) used as a layered silicate, to produce a product material.

13 parts by weight of the product material was added to 100 parts by weight of a bisphenol A type epoxy resin (JER828 manufactured by Mitsubishi Chemical Corporation), and 80 parts by weight of methyl-3,6-endomethylene-1,2,3,6-tetrahydrophthalic anhydride (MHAC-P manufactured by Hitachi Chemical Co., Ltd.) and 1.7 parts by weight of a curing accelerator (DBU manufactured by Sun Apro K.K.) were then added, followed by mixing by stirring, and vacuum defoaming, to prepare a resin composition. The resin composition was injected into a mold previously heated to 60° C., where the resin composition was subjected to vacuum defoaming, and then subjected to a curing treatment at 140° C. for 5 hours, to obtain a mica dispersion resin composition. The resin composition was injected into a coil case previously heated to 60° C., where the resin composition was subjected to vacuum defoaming, and then subjected to a curing treatment at 140° C. for 5 hours, to obtain an ignition coil.

Comparative Example 1

N-methyl stearyl amine (manufactured by Tokyo Chemical Industry Co., Ltd.) was inserted between layers of synthetic mica (ME-100, average particle diameter: 5.6 μm to 7.6 μm, aspect ratio: 56 to 76, manufactured by Co-op Chemical Co., Ltd.) used as a layered silicate, to produce a product material.

13 parts by weight of the product material was added to 100 parts by weight of a bisphenol A type epoxy resin (JER828 manufactured by Mitsubishi Chemical Corporation), and 45 parts by weight of an acid anhydride (MHAC-P manufactured by Hitachi Chemical Co., Ltd.), and 1.7 parts by weight of a curing accelerator (DBU manufactured by Sun Apro K.K.) were then added, followed by mixing by stirring, and vacuum defoaming, to prepare a resin composition. The resin composition was injected into a mold previously heated to 60° C., where the resin composition was subjected to vacuum defoaming, and then subjected to a curing treatment at 140° C. for 5 hours, to obtain a mica dispersion resin composition. The resin composition was injected into a coil case previously heated to 60° C., where the resin composition was subjected to vacuum defoaming, and then subjected to a curing treatment at 140° C. for 5 hours, to obtain an ignition coil.

<Voltage Endurance Evaluation Test>

The voltage endurance evaluation test was performed at 40 kV for the ignition coils produced in Examples 1 to 10 and Comparative Example 1. The number of times of ignition was measured until a voltage of 12 V was continuously applied to the ignition coil to cause breakdown. The results of the voltage endurance evaluation test are shown in Table 1.

TABLE 1

| | Number of times of ignition until breakdown occurs (times) |
|---|---|
| Example 1 | $3 \times 10^{10}$ |
| Example 2 | $4 \times 10^{10}$ |
| Example 3 | $3 \times 10^{10}$ |
| Example 4 | $4 \times 10^{10}$ |
| Example 5 | $8 \times 10^{10}$ |
| Example 6 | $4 \times 10^{10}$ |
| Example 7 | $4 \times 10^{10}$ |
| Example 8 | $5 \times 10^{10}$ |
| Example 9 | $6 \times 10^{10}$ |
| Example 10 | $3 \times 10^{10}$ |
| Comparative Example 1 | $7 \times 10^{9}$ |

From Table 1, it was found that a breakdown time is increased by using the insulating material (insulating resin) formed by curing the epoxy resin composition in which the amount of addition of the acid anhydride is greater than 1 equivalent of the epoxy group of the epoxy resin.

The present invention is not limited to the above-described Examples, and various modifications are included in it. For example, the above-described Examples are described in detail for convenience of explanation and good understanding of the present invention, and thus the present invention is not limited to one having all the described configurations. Additionally, it is possible to replace a part of the configuration of certain Example with the configuration of another Example, and it is also possible to add the configuration of certain Example to the configuration of another Example. Further, regarding a part of the configuration of each Example, addition of another configuration, its deletion, and replacement with another configuration can be performed.

What is claimed is:

1. An internal combustion engine ignition coil comprising:
   a central iron core;
   a primary coil disposed on an outer circumference of the central iron core;
   a secondary coil disposed on an outer circumference of the primary coil;
   a side iron core disposed on an outer circumference of the secondary coil; and
   an insulating material sealing the central iron core, the primary coil, and the secondary coil on an inner side of the side iron core, wherein a first layered silicate having a particle diameter less than a winding diameter of the secondary coil is present at a higher concentration in a vicinity of the secondary coil than that in a vicinity of the side iron core in the insulating material, a second layered silicate having a particle diameter greater than the winding diameter of the secondary coil is present at a higher concentration than that of the first layered silicate between the outer circumference side of the secondary coil and the side iron core, and the second layered silicate has an aspect ratio of 50 or more, the aspect ratio being a ratio of a long side of a particle of the layered silicate to a thickness of the particle.

2. The internal combustion engine ignition coil according to claim 1, wherein the insulating material contains carboxylic acid amide.

3. The internal combustion engine ignition coil according to claim 1, wherein the insulating material contains an inorganic particle, and the inorganic particle is made of aluminum hydroxide or silica.

4. The internal combustion engine ignition coil according to claim 1, wherein the insulating material contains an amine.

5. The internal combustion engine ignition coil according to claim 4, wherein the amine is inserted between layers of the first layered silicate and between layers of the second layered silicate.

6. The internal combustion engine ignition coil according to claim 4, wherein the amine and the first layered silicate form an organic-inorganic complex, and the amine and the second layered silicate form an organic-inorganic complex.

* * * * *